OTTO LOEHR.

Improvement in Guide Slides for Camera Boxes.

No. 125,202. Patented April 2, 1872.

125,202

UNITED STATES PATENT OFFICE.

OTTO LOEHR, OF NEW YORK, N. Y.

IMPROVEMENT IN GUIDE-SLIDES FOR CAMERA-BOXES.

Specification forming part of Letters Patent No. 125,202, dated April 2, 1872; antedated March 19, 1872.

*To all whom it may concern:*

Be it known that I, OTTO LOEHR, of the city and State of New York, have invented an Improvement in Guide-Slides for Camera-Boxes; and the following is declared to be a correct description of the same.

In a former application for a patent allowed to me April 28, 1871, a guide-slide for camera-boxes is set forth in which there is a plate attached to one edge of the frame or slide, receiving grooved guides, and on the other side are fingers running in a groove.

With cameras that require a wide slide the instrument is sometimes thrown out of adjustment axially by the expansion or contraction of the wood of the frame; and hence it is important that the sliding portion of the camera should be guided in the middle instead of near one edge, so as to keep the parts correctly in position axially of the instrument.

My present invention consists in a guide upon the sliding portion of the camera-box, near the middle of the lower side thereof, to preserve the parts properly in line as the camera is adjusted, in combination with fingers applied near the angles and entering grooves in the sides of the frame to hold said camera down to its position; but the frame can expand or contract without the movement of the slide being interfered with.

Figure 1:
Figure 2:
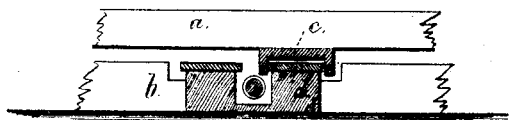

In the drawing, Figure 1 shows the frame, and slides sectionally; and Fig. 2 is a section of a slight modification in the shape of the central guiding-rib.

The lower portion $a$ of the camera-box, or a base connected therewith, are of any desired character. The frame $b$ is of a proper size for the same. Upon the lower part of the slide $a$, near the center thereof, are placed two guides, $c$, to sit over the central guiding-bar $d$, that is either a separate bar upon the frame $b$ or one of the side bars of the slot in which the adjusting-screw is placed, as in Fig. 2. These guides $c$ do not touch the top of the said bar; they only touch the sides; hence the parts may expand or contract vertically from atmospheric changes without said parts binding upon each other. At the edges of the frame $b$ are the metallic plates $i$ $i$, with grooves between them, and into these grooves pass the guide-fingers $o$ $o$, that pass down from the camera and then turn off at right angles to enter the slot between said plates $i$, and thereby hold down the angles of the slide $a$; but these fingers do not come into contact with the edges of $b$ or faces of the plates $i$; hence the parts are free to expand and contract without binding on each other, and by the guides $c$ being near the vertical central plane of the camera the parts are kept in position axially as they are adjusted, and nothing can bind and interfere with the freedom of movement.

I claim as my invention—

The guides $c$ and guide-bar $d$, applied to the parts $a$ $b$ of the camera and positioned in a plane vertically, or nearly so, beneath the axis of the camera, in combination with the fingers $o$ $o$ and guide-bars $i$, substantially as set forth.

Signed by me this 26th day of August, 1871.

OTTO LOEHR.

Witnesses:
GEO. T. PINCKNEY,
CHAS. H. SMITH.